United States Patent [19]
Tokarz

[11] Patent Number: 5,772,274
[45] Date of Patent: Jun. 30, 1998

[54] MOTORIZED DRIVE SYSTEM FOR A CONVERTIBLE ROOF OF AN AUTOMOTIVE VEHICLE

[75] Inventor: Stephen P. Tokarz, Flat Rock, Mich.

[73] Assignee: ASC Incorporated, Southgate, Mich.

[21] Appl. No.: 381,505

[22] Filed: Jan. 31, 1995

[51] Int. Cl.[6] ................................................ B60J 7/12
[52] U.S. Cl. ...................... 296/707; 296/117; 318/280
[58] Field of Search ............................ 296/117, 107, 296/116, 112, 110; 318/280, 281, 282, 283, 284, 285, 286, 466, 467, 468, 469, 470, 375

[56] References Cited

U.S. PATENT DOCUMENTS

| | | | |
|---|---|---|---|
| 2,007,873 | 7/1935 | Paulin | 296/117 |
| 2,580,486 | 1/1952 | Vigmostad | 296/117 |
| 2,985,483 | 5/1961 | Bishop et al. | 296/105 |
| 3,116,087 | 12/1963 | Baumann | 296/117 |
| 3,460,865 | 8/1969 | Podwys | 296/117 |
| 3,627,377 | 12/1971 | Pickles | 296/117 |
| 4,054,821 | 10/1977 | Williamson | 318/375 |
| 4,101,206 | 7/1978 | Oskam et al. | 350/876 |
| 4,271,381 | 6/1981 | Munz et al. | 318/282 |
| 4,275,343 | 6/1981 | Fulton et al. | 318/721 |
| 4,281,899 | 8/1981 | Oskam | 350/289 |
| 4,309,646 | 1/1982 | Liedtke et al. | 318/443 |
| 4,651,069 | 3/1987 | Pellegrini | 318/254 |
| 4,671,559 | 6/1987 | Kolb | 296/107 |
| 4,694,214 | 9/1987 | Stewart, Sr. | 310/239 |
| 4,713,568 | 12/1987 | Adam et al. | 310/112 |
| 4,720,133 | 1/1988 | Alexander et al. | 296/117 |
| 4,729,592 | 3/1988 | Tuchiya et al. | 296/116 |
| 4,743,815 | 5/1988 | Gee et al. | 318/254 |
| 4,796,943 | 1/1989 | Fukutomi et al. | 296/65.1 |
| 4,854,634 | 8/1989 | Shiraishi et al. | 296/108 |
| 4,916,370 | 4/1990 | Rowan et al. | 318/368 |
| 4,991,903 | 2/1991 | Okabe et al. | 296/112 |
| 5,006,747 | 4/1991 | Stewart, Sr. | 310/239 |
| 5,019,755 | 5/1991 | Walker | 318/13 |
| 5,106,145 | 4/1992 | Corder | 296/107 |
| 5,161,852 | 11/1992 | Alexander et al. | 296/108 |
| 5,225,747 | 7/1993 | Helms et al. | 318/265 |
| 5,303,101 | 4/1994 | Hatch et al. | 360/105 |
| 5,327,055 | 7/1994 | Danielson et al. | 318/366 |
| 5,486,759 | 1/1996 | Seiler et al. | 318/466 X |
| 5,542,735 | 8/1996 | Furst et al. | 296/107 |

OTHER PUBLICATIONS

Machine Design—"Braking Brush–Type Motors Dynamically" and Braking Gearmotors, vol. 64, No. 12, pp. 3, 484, Jun. 1992.

"Affidavit of Michael A. Porter", 4 pages, Sep. 28, 1995.

Vincent Del Toro, Electric Machines and Power Systems, 1985, pp. 370–371.

Primary Examiner—David M. Mitchell
Attorney, Agent, or Firm—Harness, Dickey & Pierce, P.L.C.

[57] ABSTRACT

A motorized convertible roof system includes at least a portion of a retractable convertible roof operably driven by an electric motor. The motor is operable to maintain the moved portion of the convertible roof in a predetermined position thereby deterring drifting of the convertible roof. In one aspect of the present invention, back EMF deters motor and convertible roof movement. In another aspect of the present invention, an electric motor can be electrically bypassed for manual movement of a convertible roof without necessitating physical disengagement or decoupling of the motor, gears or linkage mechanism.

44 Claims, 7 Drawing Sheets

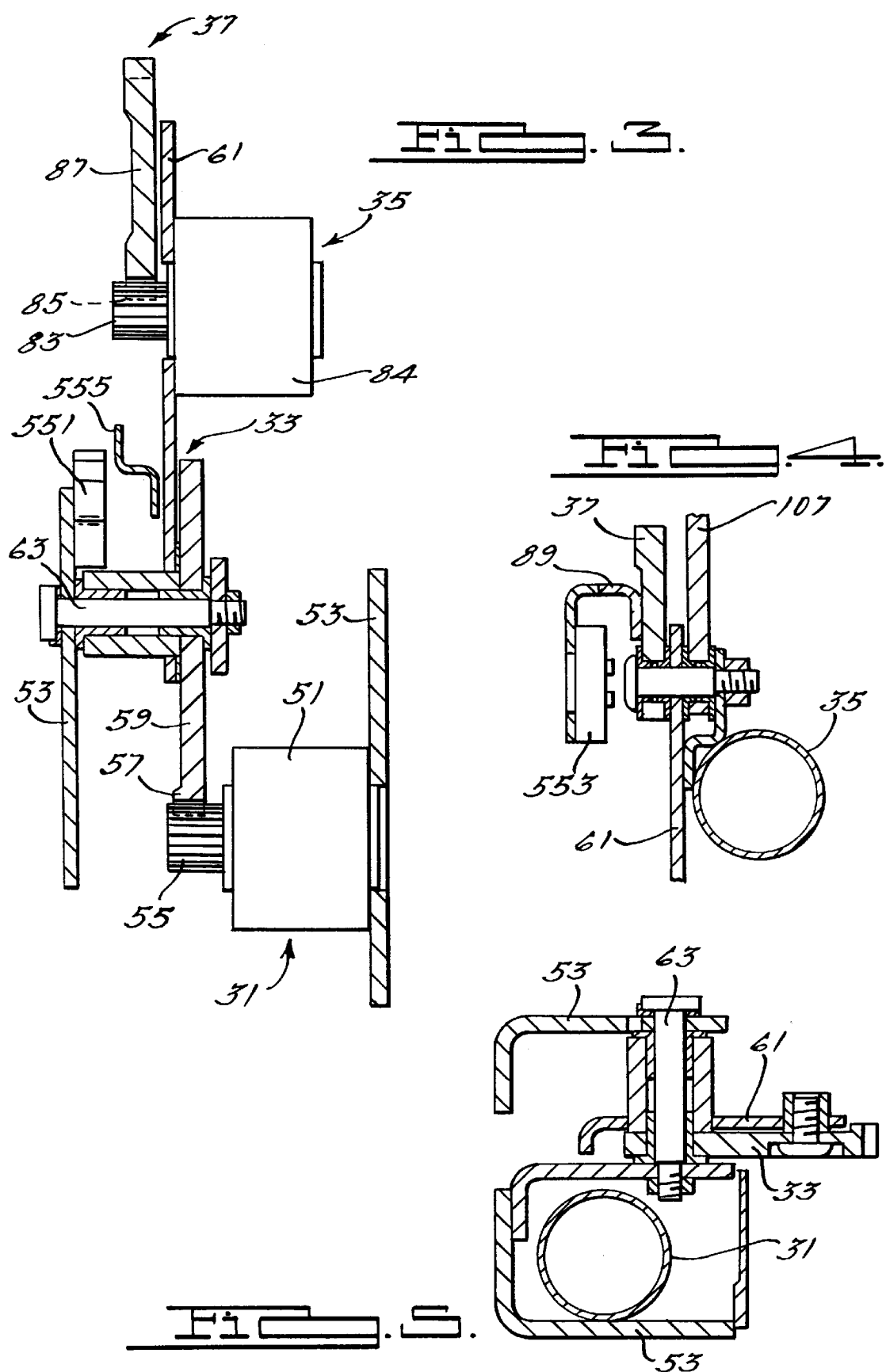

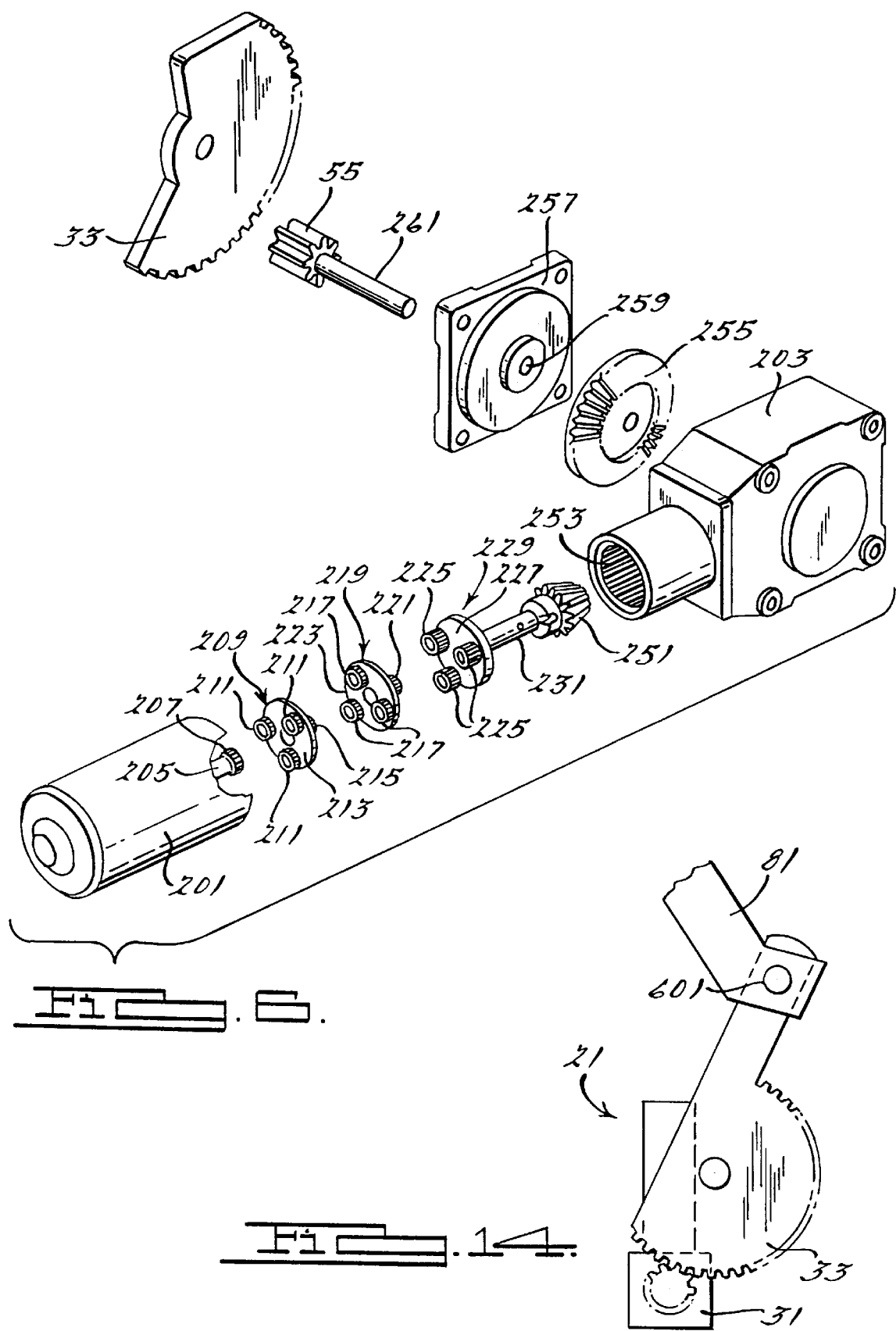

5,772,274

MOTORIZED DRIVE SYSTEM FOR A CONVERTIBLE ROOF OF AN AUTOMOTIVE VEHICLE

BACKGROUND AND SUMMARY OF THE INVENTION

The invention relates generally to convertible roofs for automotive vehicles and specifically to a motorized drive system for a convertible roof.

Convertible automotive vehicles commonly employ a soft top or a hard top roof which is retractable from a fully raised position covering a passenger compartment to a lowered and retracted position stowed on top of a rear seat, behind a rear seat, in a boot well or in a trunk of the vehicle. A soft-top roof usually consists of a multi-linkage mechanism which moves a top stack mechanism having a plurality of collapsible roof bows. A fabric roof cover is stretched between these bows. A hard-top roof typically consists of two or more entirely rigid panels which fold or slide against each other when retracted by a multi-linkage mechanism. These soft or hard-top multi-linkage mechanisms are often manually operable or driven by a hydraulic or electric motor actuator. Examples of such convertible roof constructions are described and shown in the following U.S. Pat. No. : 5,161,852 entitled "Convertible Top With Improved Geometry" which issued to Alexander et al. on Nov. 10, 1992; 5,106,145 entitled "Convertible Stack System" which issued to Corder on Apr. 21, 1992; 4,720,133 entitled "Convertible Top Structure" which issued to Alexander et al. on Jan. 19, 1988; 4,991,903 entitled "Drive Equipment for Opening and Closing of a Vehicle Top" which issued to Okabe et al. on Feb. 12, 1991; 4,671,559 entitled "Driving Arrangement for a Foldable Roof" which issued to Kolb on Jun. 9, 1987; 3,627,377 entitled "Top Lift Actuator" which issued to Pickles on Dec. 14, 1971; 2,580,486 entitled "Collapsible Top for Vehicles" which issued to Vigmostad on Jan. 1, 1952; and, 2,007,873 entitled "Vehicle Body Top Capable of Being Stowed Away" which issued to Paulin on Jul. 9, 1935; the disclosures of all these patents are incorporated by reference herewithin. The majority of electric motor systems employ worm gear, jackscrew, or pulley and cable drive mechanisms.

Another known electric motor driven soft-top convertible roof is characterized by two dc motors coupled together along a single rotating armature shaft which serve to rotate a cable directly connected thereto within its sheath. This cable, in turn, directly rotates a worm gear that is engaged to a single stage planetary gear set. The planetary gear set of this system serves to rotate a sector gear having an arm extending therefrom connected to the top stack mechanism. The arm can be decoupled from the top stack mechanism by removing a coupling pin fastening the two together. The coupling pin must be removed, thereby physically decoupling the drive mechanism, in order to manually raise or lower the convertible roof top stack mechanism due to the large amount of friction present within the cables, gears and motors. Furthermore, this system only generates approximately 150–180 foot/pounds of torque to the sector gear.

Another conventional soft-top driving mechanism is known which provides a relatively large motor having an armature shaft which directly drives a worm gear. A separate gear box has a plurality of differently sized spur gears so as to reduce the gear ratio provided by the worm gear. The spur gears drive the top stack mechanism. In order to manually raise and lower the convertible roof of this construction, a lever is used to pivot and physically disengage the motor from the associated spur gears. The prior two constructions, and the associated disengaging or decoupling operations, are employed on both sides of the vehicle.

Traditional soft-top convertible roofs possess an inherent drift problem. In other words, when the convertible roof is moved to its fully raised position, the forwardmost or first roof bow is positioned against the front header for subsequent latching. However, the stretched fabric covering acts to pull the first roof bow in an unintended and undesired rearward direction such that it drifts away from the front header. This drifting situation is especially apparent in new convertible roofs. Accordingly, the vehicle occupant must then physically pull down upon a handle attached to the first roof bow thereby pulling it against the front header for subsequent latching. This manual action presents a crude and unrefined operational perception whereby many occupants consider the convertible roof as defective. This drifting problem is also present between a rearmost or fifth roof bow and an adjacent tonneau cover. The fifth roof bow must be raised to an upward position while the tonneau cover is returned from a substantially vertical position to a substantially horizontal position; the fifth roof bow is then pivoted to its lowered position against an upper surface of the tonneau cover for latching thereto. However, the stretched fabric covering tends to pull the fifth roof bow in a forward manner thereby causing it to drift away from the tonneau cover. This has proven extremely problematic due to seated inaccessibility of this area to a front seat occupant.

Totally apart from convertible roofs, it is also known to provide an automotive window lift motor with a dynamic braking back electromotive force (EMF) function, caused by continuing rotation of an armature, to quickly stop the movement of a side window and the associated window lift mechanism when the window reaches its desired stop position. However, these window lift motors employ a worm gear mounted on an armature shaft which drives a larger spur gear coupled to a scissor arm and cable window lift mechanism. When the window and window lift mechanisms are stopped, they are maintained in their desired position primarily through friction within the mechanism rather than through the creation of any back EMF in the motor. Furthermore, there is very little gear reduction present in such motors. Examples of other back EMF controlled devices are disclosed within the following U.S. Pat. Nos.: 5,327,055 entitled "Mechanical Brake Hold Circuit for An Electric Motor: which issued to Danielson et al. on Jul. 5, 1994; 5,303,101 entitled "Active Magnetic Latch for Disk Drive and Method" which issued to Hatch et al. on Apr. 12, 1994; 4,916,370 entitled "Motor Stoppage Apparatus and Method Using Back EMF Voltage" which issued to Rowan et al. on Apr. 10, 1990; 4,651,069 entitled "Back-EMF Brushless D.C. Motor Drive Circuit" which issued to Pellgrini on Mar. 17, 1987; and, 4,275,343 entitled "Back EMF Controlled Permanent Magnet Motor" which issued to Fulton et al. on Jun. 23, 1981.

In accordance with the present invention, the preferred embodiment of a motorized drive system for a convertible roof of an automotive vehicle includes at least a portion of a retractable convertible roof operably driven by an electric motor. The motor is operable to maintain the moved portion of the convertible roof in a predetermined stopped position thereby deterring drifting of the convertible roof. In one aspect of the present invention, back EMF deters motor and convertible roof movement when in a fully raised position such that front header or tonneau cover latches can be readily engaged therewith. In another aspect of the present invention, an electric motor can be electrically bypassed for manual movement of a convertible roof without necessitating physical disengagement or decoupling of the motor, gears or linkage mechanism. In yet a further aspect of the present invention, a powerful yet small sized electric motor is used to drive a convertible roof. The present invention also provides a cost effective and easily packaged coupling mechanism between a roof and a motor.

The motorized drive system for a convertible roof of an automotive vehicle of the present invention is advantageous over conventional systems in that the present invention reduces drifting of the raised convertible roof from the front header and tonneau cover. This provides greatly improved control and accuracy of the convertible roof positioning in relation to mating components. The precision and repeatability of automated latching devices engaging with convertible roof strikers are greatly enhanced without the additional necessity of vehicle occupant assistance. Another advantage is that the present invention motorized drive system is manually overridable without the need for physically disengaging or decoupling various component parts thereof. The present invention additionally acts as a dynamic brake in order to slow down and accurately stop top movement at the desired position and in a controlled manner without damaging gear teeth, bending linkages or decoupling linkages. The motorized drive system construction also provides significant motor armature movement and back EMF in response to a minor amount of convertible roof movement. Theoretically, the motorized drive system of the present invention can also be used to maintain the roof in a fully raised position without the need for additional latches. Moreover, the motorized drive system of the present invention supplies a tremendous amount of rotational torque within a very small packaging space. Thus, there is improved passenger space within a rear seating area of the automotive vehicle. The present invention is also quite efficient and cost effective to manufacture, install and operate especially compared to bulky, expensive, messy and difficult to install hydraulic systems. Additional advantages and features of the present invention will become apparent from the following description and appended claims, taken in conjunction with the accompanying drawings.

BRIEF DESCRIPTION OF THE DRAWINGS

FIG. 3 is a cross sectional view, taken along line 3—3 of FIG. 2, showing the preferred embodiment motorized drive system;

FIG. 4 is a cross sectional view, taken along line 4—4 of FIG. 2, showing the preferred embodiment motorized drive system;

FIG. 5 is a cross sectional view, taken along line 5—5 of FIG. 2, showing the preferred embodiment motorized drive system;

FIG. 6 is an exploded perspective view showing a typical motor and sector gear of the preferred embodiment motorized drive system of the present invention of FIG. 1;

FIG. 14 is a diagrammatic side elevational view showing a first alternate embodiment motorized drive system of the present invention; and FIG. 15 is a diagrammatic side elevational view showing a second alternate embodiment motorized drive system of the present invention.

DETAILED DESCRIPTION OF THE PREFERRED EMBODIMENT

Figure 1:
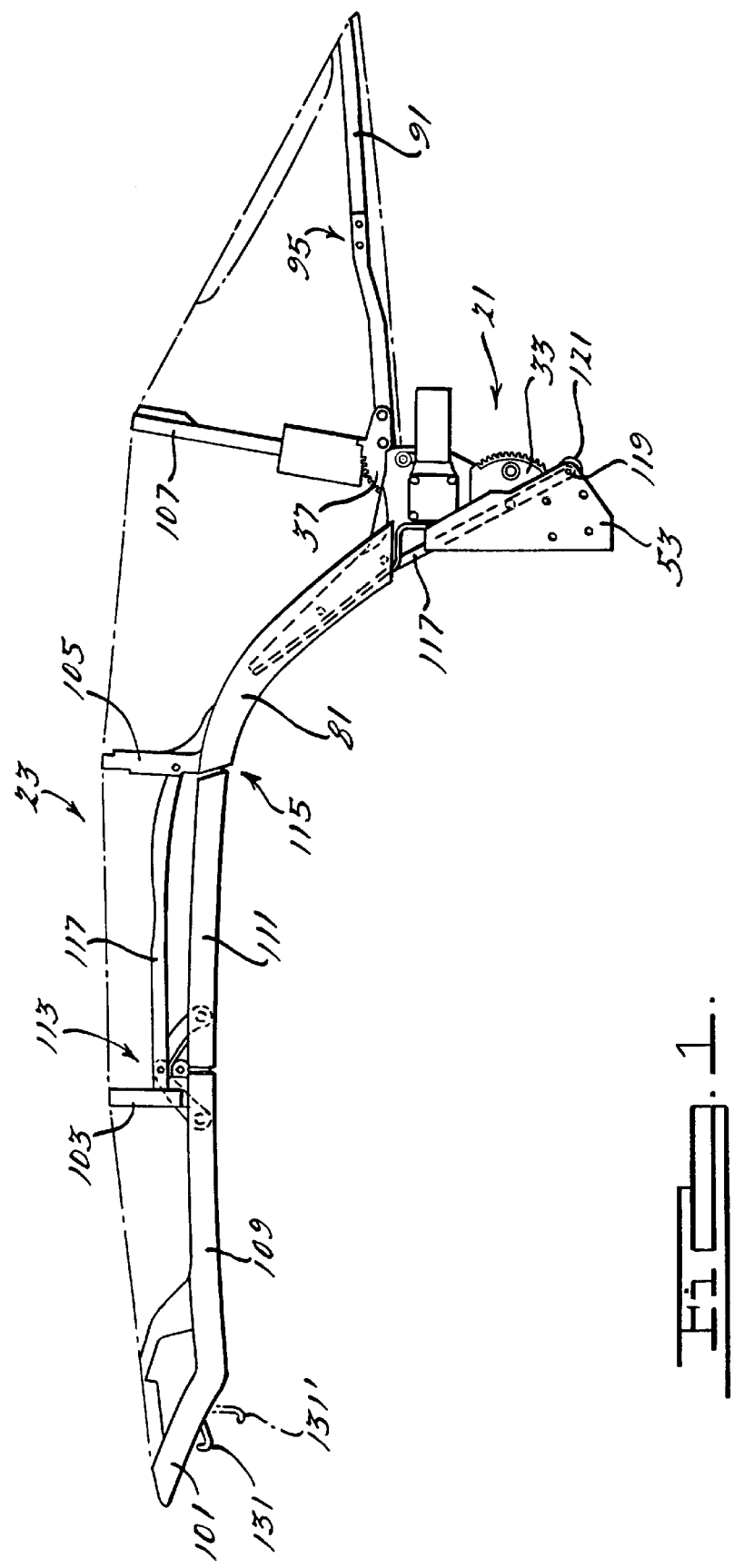
FIG. 1 is a side elevational view of the preferred embodiment motorized drive system of the present invention coupled to a convertible roof.

A motorized drive system 21 and a convertible roof 23 are best shown in FIG. 1. Convertible roof 23 can be a soft-top variety, having a plurality of roof bows with a fabric covering stretched therebetween, or a hard-top variety (see FIG. 15) having a rigid front roof section 25 and a rigid rear roof section 27. Hard-top roof sections 25 and 27 are coupled together by a multi-link hinge and are foldable against each other in an inwardly clamshelling manner. Front roof section 25 of the hard-top roof is stowed in a substantially horizontal orientation beneath a tonneau cover or trunk lid. The exemplary soft-top roof will be described in greater detail hereinafter, however, it must be realized that either roof type, or a combination of the two, may be employed with the present invention.

Figure 7:
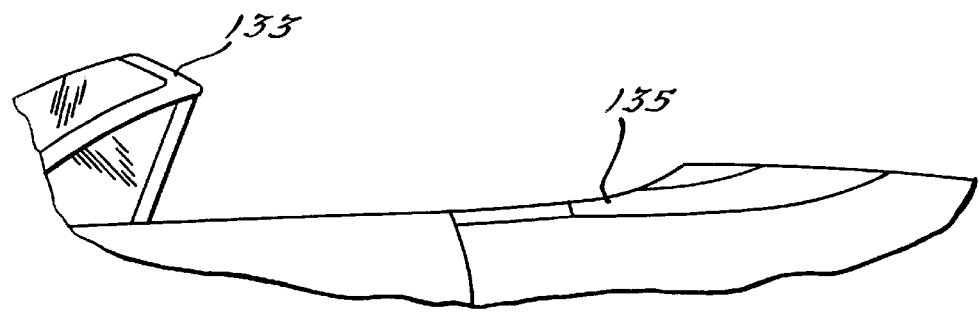
FIGS. 7–12 are a series of side elevational views showing the raising sequence for the convertible roof driven by the preferred embodiment motorized drive system of the present invention of FIG. 1.
Figure 8:
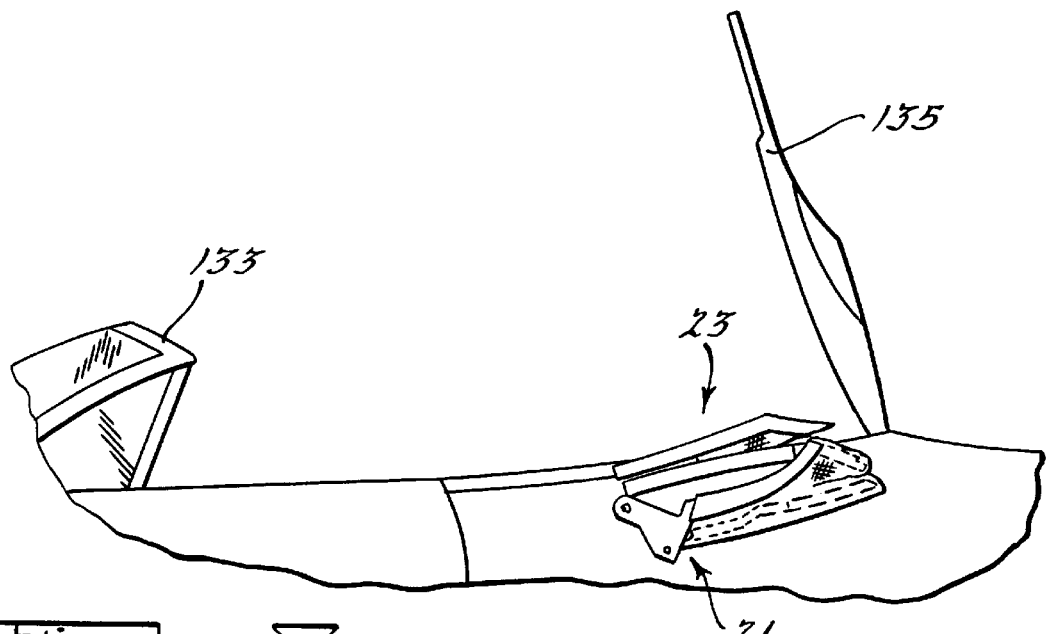
Figure 9:
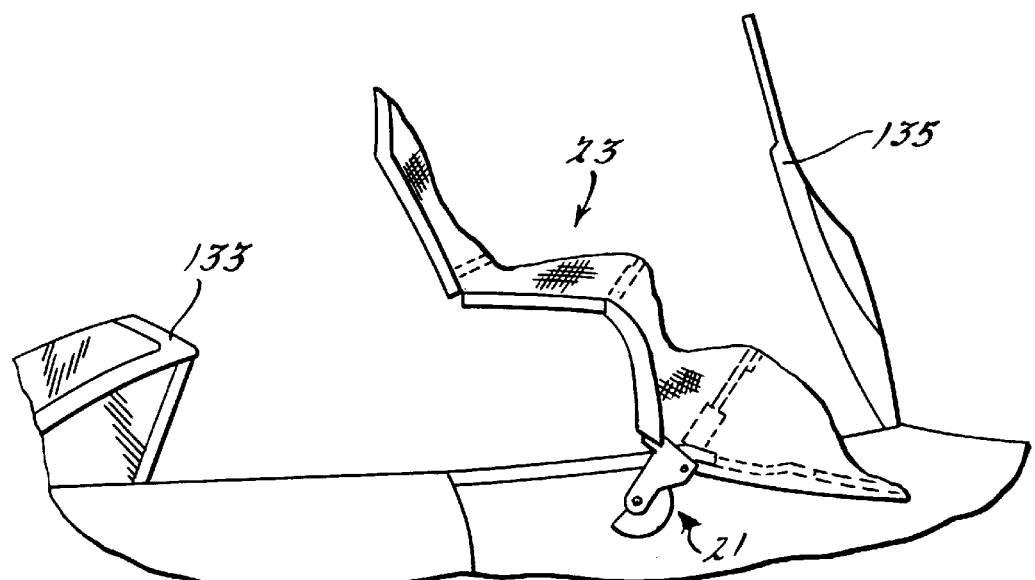
Figure 10:
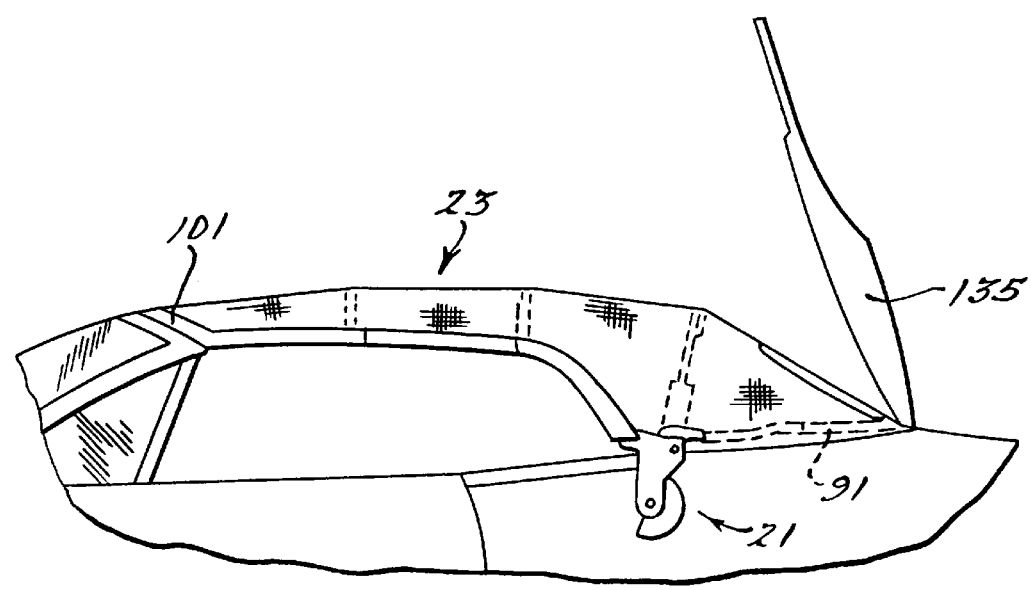
Figure 11:
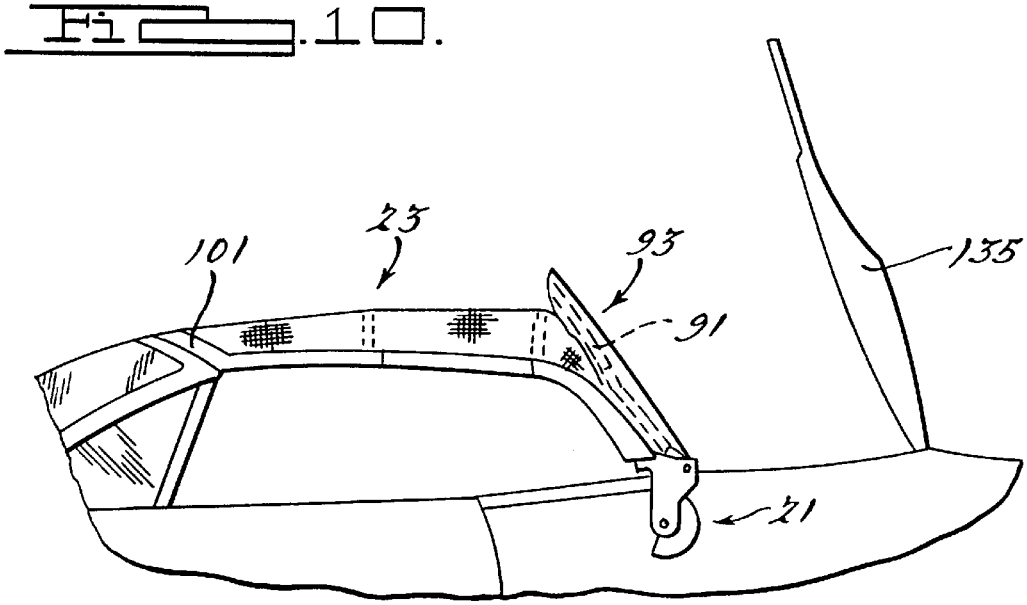
Figure 12:
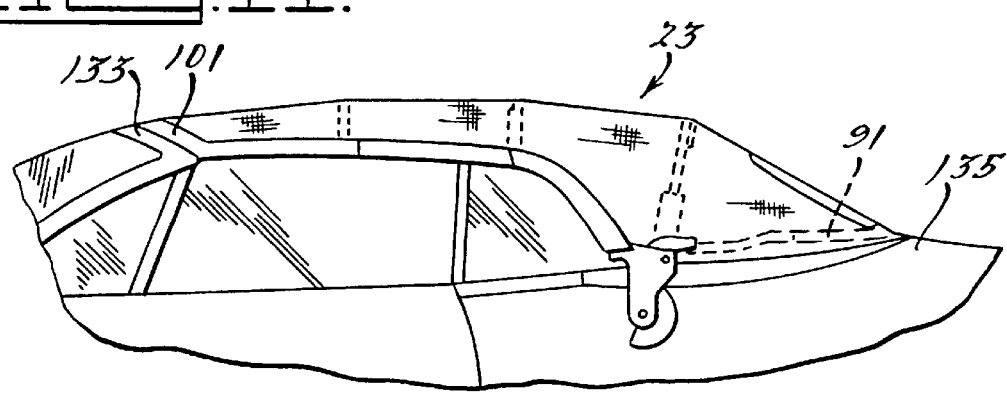
Figure 12:
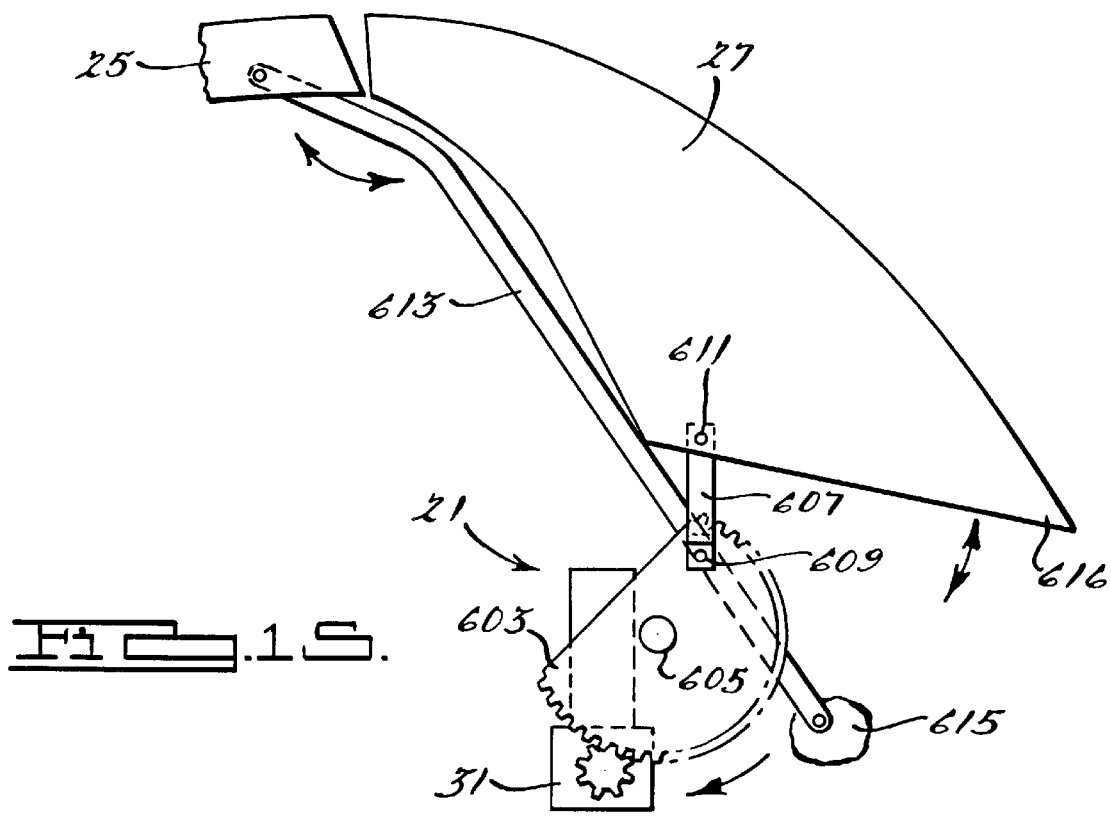

The operation of soft-top convertible roof 23 is shown in FIGS. 7–12. FIG. 7 illustrates convertible roof 23 in its fully retracted and stowed position below a closed tonneau cover 135. Referring to FIG. 8, tonneau cover 135 is shown in its open pivoted position while motorized drive system 21 begins to unfold the top stack mechanism. FIG. 9 depicts convertible roof 23 in a partially raised position while FIG. 10 shows convertible roof 23 in a more fully raised position. A five bow 91 is then moved to its substantially vertical position as is illustrated in FIG. 11 such that tonneau cover 135 can then pivotably return to its closed position. FIG. 12 illustrates convertible roof 23 in its fully raised position against a front header 133 with five bow 91 lowered against the closed tonneau cover 135.

Referring to FIGS. 1–5, the preferred embodiment of motorized drive system 21 of the present invention includes a first electric motor 31, a roof driving mechanism or sector gear 33, a second electric motor 35, and a five bow driving mechanism or sector gear 37. Another pair of motors and sector gears are disposed and synchronously operated on the opposite side of the automotive vehicle in mirrored symmetry with those shown in FIGS. 1–5. Motorized drive system 30 further includes an electrical circuit 41 (see FIG. 13) for controlling the motors.

Motor 31 has a gear box 51 bolted onto a front wall of a main bracket 53 such that bracket 53 is fastened to a reinforcement panel inwardly adjacent to inner and outer quarter panels of the automotive vehicle through nuts engaging threaded weld studs. Bracket 53 is stamped from 1008–1018 grade steel. An output pinion gear 55 extending from gear box 51 is in enmeshed engagement with a toothed segment 57 projecting from a body 59 of sector gear 33. Sector gear 33 further has a stamped steel rail extension bracket 61 extending therefrom and bolted or riveted thereto. Sector gear 33 is pivotably attached to a second wall of main bracket 53 at pivot point 63. Various spacers and wear resistant bushings are disposed between sector gear 33, main bracket 53, rail extension bracket 61 and the bolt. A cast aluminum rear roof rail 81 is bolted onto rail extension bracket 61 for congruent movement therewith.

Second motor 35 is also bolted onto rail extension bracket 61 outward of sector gear 33 such that an output pinion gear 83 of the motor's gear box 84 protrudes through a hole adjacent therewith. Output pinion gear 83 of second motor 35 is in enmeshed engagement with a toothed segment 85 projecting around a body 87 of five bow sector gear 37. Sector gear 37 is bolted onto a stamped steel five bow extension bracket 89 which is also bolted to a number five bow 91. Therefore, five bow sector gear 37 and five bow 91 are capable of pivoting in conjunction with roof sector gear 33 while also being capable of independently pivoting between a substantially vertical five bow position 93 and a lowered five bow position 95. Sector gears 33 and 37 are formed from a powdered Atomet 4401 copper infiltrated steel alloy. Both sector gears and both output pinion gears also have teeth with a 20 degree pressure angle, 135.4668 millimeter pitch diameter and 12 millimeter diametral pitch. Both output pinion gears 55 and 83 further have eight teeth and a no load speed of 17–20 rpm at 13.5 volts. Alternately, motor 31 can drive sector gear 33 which, in turn, can drive a linkage that would move five bow 91; this would preclude the need for a separate five bow motor.

Convertible roof 23 preferably has a top stack mechanism which includes a one bow 101, two bow 103, three bow 105, four bow 107 and five bow 91. The top stack mechanism further includes a pair of front rails 109 which are hingeably coupled to a pair of center rails 111 through a multi-link hinge 113. The top stack mechanism additionally includes rear rail 81 which is coupled to center rail by hinge 115. A balance link 117 has a forward end pivotably coupled to hinge 113 and an opposite rearward end pivotably coupled to a bolt 119 and sandwiched between bracket 53 and a stamped support 121.

For the exemplary soft-top roof shown, a pair of manually operable latches 131 are mounted upon number one bow 101 for engagement with a pair of corresponding strikers or cavities positioned on a front header 133. These latches are pivotable in a fore and aft manner between a disengaging and engaging position. When latches 131 engage the adjacent strikers, one bow 101 is thereby secured to front header 133 with an elastomeric weatherstrip compressed therebetween. A pair of automated latches are also disposed below a rigid tonneau cover 135 for engagement with a pair of strikers projecting downward from five bow 91 when in its lowered position 95. These strikers extend through coincidental apertures within tonneau cover 135 so that the latches may be moved from their disengaging positions to their engaging positions thereby securing number five bow 91 and the associated weatherstrip thereagainst. An example of an automated latch and striker system which can be applied to the front header and/or tonneau cover constructions as described heretofore is disclosed within U.S. Pat. No. 5,301, 987 entitled "Convertible Top Stack Latch" which issued to Tokarz et al. on Apr. 12, 1994, and is incorporated by reference herewithin. Of course, other automated or manual rotating or sliding wedges, hooks, sockets, or strikers may be provided on either the convertible roof or the vehicle body.

The motors are substantially identical to each other and are preferably constructed as illustrated in FIG. 6. These motors 31 and 35 are each direct current, electric motors producing approximately 0.02 horsepower. Exemplary motor 31 has an armature housing 201 and a gear box 203. A noise shield encapsulates housing 201. A fixed, permanent magnet stator (not shown) is positioned within armature housing 201 to substantially surround a wire wound armature (not shown). The armature is mounted upon an armature shaft 205 for rotation therewith. Examples of such stators and armatures as well as typically related commutators and brush card assemblies are disclosed within the following U.S. Pat. Nos.: 5,006,747 entitled "Dynamoelectric Machine Brush Rigging and Method of Assembly" which issued to Stewart, Sr. on Apr. 9, 1994; 4,713,568 entitled "Closed Motor/Transmission Unit" which issued to Adam et al. on Dec. 15, 1987; and, 4,694,214 entitled "Brush Holder for Dynamoelectric Machines" which issued to Stewart, Sr. on Sept. 15,1987; the disclosures of which are incorporated by reference herewithin.

An armature pinion gear 207, acting as a sun gear, is affixed to an end of armature shaft 205. A first planetary gear subassembly 209 includes three powdered metal planetary gears 211 rotatably mounted upon a first metallic plate 213. Planetary gears 211 are in enmeshed engagement with armature pinion gear 207. A sun gear 215 is oppositely affixed to plate 213 and is enmeshed with three planetary gears 217 of a second planetary gear subassembly 219. A second sun gear 221 is oppositely affixed to a second plate 223 of second subassembly 219 and is further enmeshed with three planetary gears 225 journalled about a plate 227 of a third planetary gear subassembly 229. An affixed pintle 231 projects from an opposite face of plate 227 and has a beveled pinion gear 251 affixed thereto. Planetary gears 211, 217 and 225 are further enmeshed with a fixed ring gear 253 disposed within a collar of gear box 203. A bevel gear 255 is also disposed within gear box 203 and is enmeshed with beveled pinion gear 251. A cover plate 257 is attached to gear box 203. Cover plate 257 has an orifice 259 centrally therein for rotationally supporting a cylindrical shaft 261 affixed to and extending from output pinion gear 55. Bevel gear 255 is also mounted upon shaft 261 for normally driving output pinion gear 55. Each planetary gear shape provides a 4.5–5.0:1 gear reduction ratio while the beveled gear set supplies a 2.8:1 gear reduction ratio such that the overall gear reduction ratio is approximately 300:1 between the armature shaft and the output pinion gear. Thus, approximately 31 foot/pounds of torque, as measured at output pinion gear 55, is converted into approximately 250 foot/pounds of torque at the pivot of sector gear 33. Thus, a small direct current electric motor provides tremendous mechanical power to drive the convertible roof top stack mechanism. This is especially advantageous for relatively heavy hard-top roofs. Of course, depending on the driving mechanism geometry and the weight of the convertible roof, other planetary gear, or even spur gear, combinations may be employed. It may also be plausible to drive the entire convertible roof top stack mechanism with a single electric motor if the top stack mechanism is sufficiently reinforced to prevent binding during movement thereof.

Figure 13:
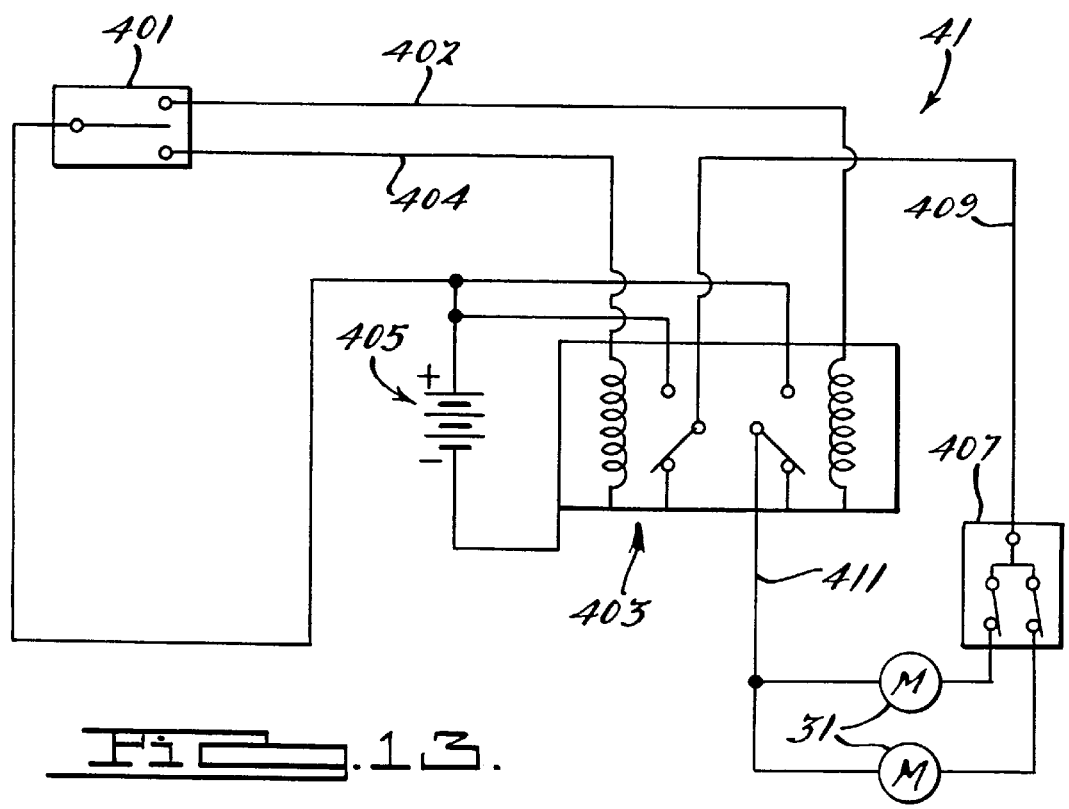
FIG. 13 is an electrical schematic diagram showing the preferred embodiment motorized drive system of the present invention of FIG. 1.

The anti-drift feature of the present invention is achieved through use of back electromotive force (EMF) created within motors 31 and 35. Referring to FIG. 13, control circuit 41 controls the operation of a pair of top stack drive motors 31. A similar control circuit is used to control the five bow motor. Circuit 41 includes an up/down switch 401 positioned on a floor mounted console or an instrument panel and is accessible and operable by the vehicle occupant. Switch 401 is typically a double pole, single throw low current toggle switch which the occupant must continually depress during desired raising or lowering movement of the convertible roof until it reaches a predetermined and desired stop position. A polarity reversing relay assembly 403, or alternately a single polarity reversing switch assembly, is electrically coupled to both the up and down electrical circuit paths, respectively 402 and 404, emanating from switch 401. DC current is supplied from a power supply 405 and is switched by the normally closed relay 403. During raising and lowering movement of the convertible roof, electrical current is supplied through relay 403 to a double pole, double throw bypass switch 407 and then onto motors 31. The circuit for the five bow motors can also run through this same type of bypass switch but will require a separate relay. Bypass switch 407 is a normally closed toggle switch located within a passenger or trunk compartment of the automotive vehicle. Operation of the bypass mode of bypass switch 407 places the contacts within the bypass switch 407 into an open circuit state; this electrically disconnects motors 31 from power supply 405 and open circuits the motor armature windings. Thus, the vehicle occupant can manually raise or lower the convertible roof (or raise or lower the number five bow) while allowing the sector gears and coupled motors to freely spin with no dynamic braking resistance. Furthermore, due to the minimal number and specific type of driving mechanism components employed, friction is significantly reduced over more traditional constructions.

When the convertible roof has reached its predetermined position, usually when the weatherstrip of the one bow is positioned against the front header such that the one bow is within latch engaging distance, the vehicle occupant releases the up/down switch 401. Operating synchronously therewith, the five bow has also reached its predetermined position, usually within latch engaging distance of the tonneau cover such that the five bow weatherstrip contacts thereagainst. Relay 403 then electrically connects motor circuit paths 409 and 411 together and to a ground upon the vehicle occupant releasing up/down switch 401. This situation acts to short circuit motors 31 thereby causing any rotation of the armatures therein to generate back EMF between the armatures and stators. Such armature movement would be caused by kinetic rotational energy remaining through continued movement of the top stack and driving mechanisms after up/down switch 401 has been released; thus, in this scenario, the back EMF of the motor would act as a dynamic break to control the stopping action of the top stack mechanism. More importantly, back EMF would also be created upon undesired drifting of the one bow (or five bow) away from the desired and predetermined stop position. Accordingly, portions of the convertible roof are maintained in their desired stopped positions by electromagnetic forces generated within the motors upon movement from a stopped position. Based upon the large gear reductions within the motors, a very slight (e.g., approximately 3/16ths of an inch or less) movement of the convertible roof will cause significant back EMF generation. In one test construction, the back EMF generated was found to be greater than 30 volts such that 120 pounds of force must be applied at the number one bow to override the back EMF and manually move the convertible roof without activating the bypass switch 407. However, the back EMF voltage and overriding forces will vary depending on the specific roof geometry, circuit path resistance and current losses, and specific motor construction.

Figure 2:
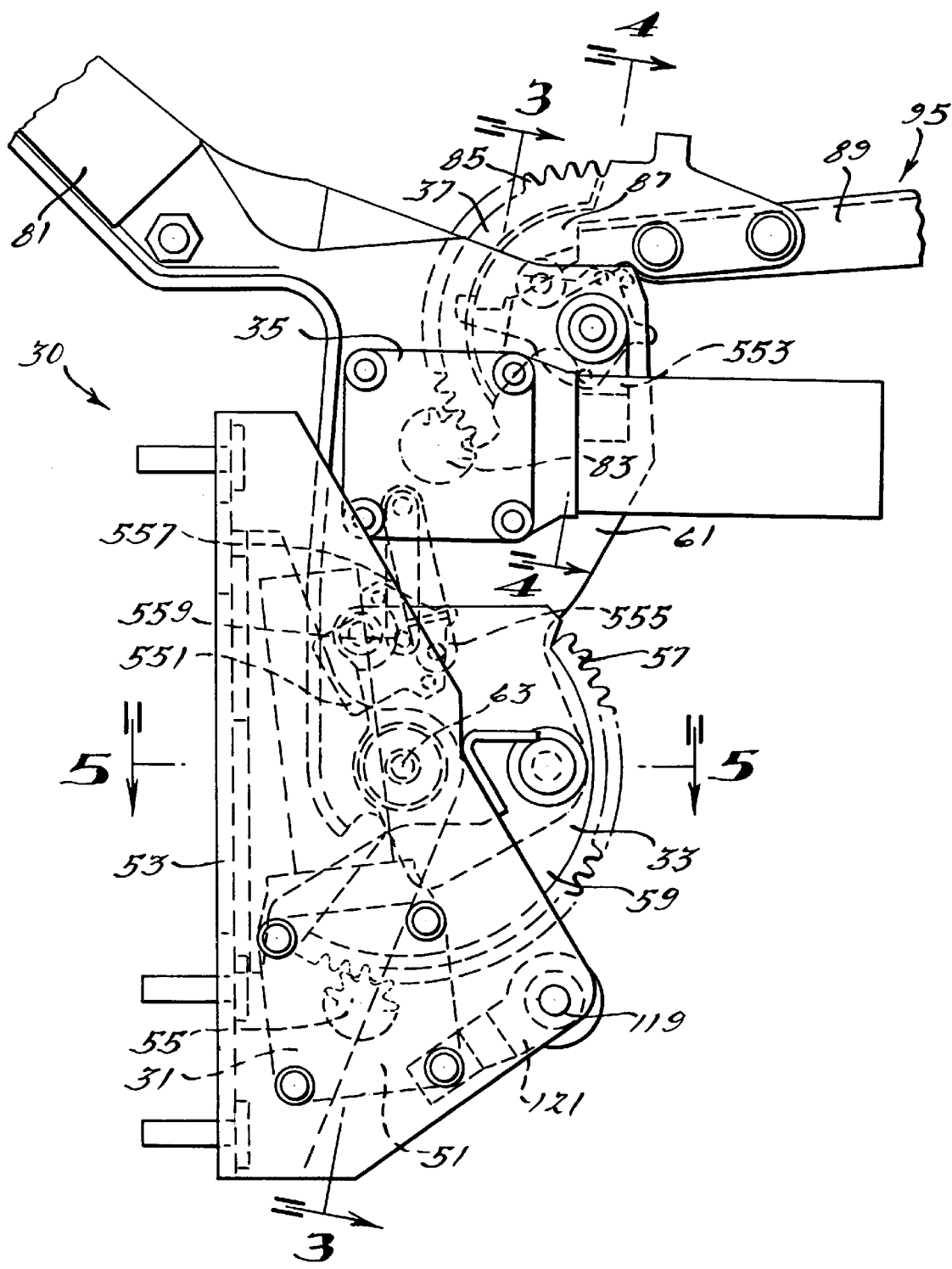
FIG. 2 is an enlarged side elevational view showing the preferred embodiment motorized drive system of the present invention of FIG. 1.

Relay 403 can be integrated into an electric control unit, such as a microprocessor, or may be a separate solid state component added within a discretely wired circuit path. Referring to FIGS. 2–4, potentiometers 551 and 553 and other position sensors or limit switches may be also included in combination with the present invention motorized drive system. Such a position sensor is described in U.S. Pat. No. 5,225,747 entitled "Single-Button Actuated Self-Correcting Automatic Convertible Top" which issued to Helms et al. on Jul. 6, 1993, and is incorporated by reference herewithin. A first link 555 has one end pivotably coupled to rail extension 81 and a second end pivotably riveted to a first end of a second link 557. A second end of second link 557 has a key holed opening engaging with a matching post 559 of potentiometer 551. A similar construction is used with the five bow system.

It has been found that the use of planetary gears within the motor of the present invention has provided surprisingly and significantly improved back EMF results as compared to traditional worm gear type motors. The present invention motorized drive system is ideally suited for the long lever arm linkage geometries and forces associated within convertible roof systems. It has been found that worm gears and jackscrews are difficult, if not impossible, to back drive. In theory, the back EMF of the present invention motorized drive system should be capable of maintaining the one bow against the front header such that mechanical latches therebetween would be unnecessary. To achieve such results in practice, the back EMF would have to be even stronger through less convertible top movement than that generated with the embodiment disclosed herein. Regardless, the slight pulling movement of the one bow away from the front header (and the five bow away from the tonneau cover) of the preferred embodiment prior to sufficient generation of the back EMF is insignificant enough such that the undesired drifting is substantially prevented and the roof is latched without requiring supplemental manual pulling.

FIG. 14 discloses an alternate embodiment driving mechanism 21 wherein electric motor 31 drives sector gear 33 which, in turn, is directly coupled for rotation to rear roof rail 81 through a pivot point 601 on an integral arm. FIG. 15 depicts a second alternate embodiment of driving mechanism 21. In this embodiment, electric motor 31 rotates a modified sector gear 603 about pivot point 605. An offset intermediate link 607 is pivotably coupled to a sector gear at pivot point 609. An opposite end of intermediate link 607 is pivotably coupled to rear hard-top section 27 at pivot point 611. A balance link 613 is coupled between a reinforcement or quarter inner panel 615 and a multi-link hinge (not shown) attached between front hard-top section 25 and rear hard-top section 27. Additional rear track or cable means may be necessary for pivoting of a rearmost corner 616 of rear roof section 27. Any of the aforementioned drive mechanisms 21 of the present invention may be employed with either a soft-top or hard-top roof. These alternate embodiments are electrically operable as heretofore described with the preferred embodiment.

While the preferred embodiment of this motorized drive system has been disclosed, it will be appreciated that various modifications may be made without departing from the present invention. For example, the sector gears and linkages may have differing shapes, integrally formed bracket arms, geared portions and pivots. Furthermore, the motor which drives either the top stack mechanism or five bow can be mounted upon the convertible roof for movement relative to the automotive vehicle body. Additionally, although not preferred, the electric motor may drive intermediate cables, rack and pinion assemblies, chains, belts or other mechanical coupling devices in combination with certain aspects of this invention. Moreover, the bypass switching feature may be alternately achieved or deleted altogether. The drive system can also employ mechanical means, such as solenoids, brake shoes or the like, to deter roof drifting. Various materials and circuits have been disclosed in an exemplary fashion, however, various other materials and circuits may of course be employed. It is intended by the following claims to cover these and any other departures from the disclosed embodiments which fall within the true spirit of this invention.

The invention claimed is:

1. An apparatus for an automotive vehicle, said apparatus comprising:
   a retractable convertible roof;
   a drive mechanism including a first electric motor operable to move a portion of said convertible roof between a first position and a second position, said drive mechanism further being operable to substantially maintain said portion of said convertible roof in a predetermined stopped position when said convertible roof is at least partially raised, an armature of said first electric motor always being drivably coupled with said convertible roof when installed in said vehicle;
   a first sector gear being rotatably driven by said first motor;
   a member extending from and moving concurrent with said first sector gear;
   a second sector gear being journalled upon said member; and
   a second electric motor having an output gear enmeshing with said second sector gear.

2. The apparatus of claim 1 wherein said portion of said convertible roof is defined as a forwardmost portion, whereby said convertible roof latches to a front header without requiring supplemental pulling by a vehicle occupant of said convertible roof toward said front header.

3. The apparatus of claim 1 further comprising:
   a rear roof rail;
   an electrical circuit;
   an output pinion gear of said first motor directly enmeshing with teeth of said first sector gear, said first motor always coupling with said first sector gear once installed in said automotive vehicle, said first sector gear always coupling with said rear roof rail once installed in said automotive vehicle, said convertible roof always coupling with said rear roof rail once installed in said automotive vehicle:
   whereby manual movement of said convertible roof coupled to said rear roof rail causes said first sector gear and said output pinion gear to freely rotate when said associated electrical circuit connected to said first motor is electrically opened.

4. The apparatus of claim 1 wherein said convertible roof is further defined as a soft top roof having a top stack mechanism constructed from a plurality of roof bows covered by fabric-type material stretched therebetween.

5. The apparatus of claim 4 wherein:
   said second sector gear is coupled to a rearmost of said plurality of roof bows for providing pivotable movement between a first upward position and said second lowered position; and
   said output gear of said second electric motor is directly enmeshed with said second sector gear.

6. The apparatus of claim 1 further comprising a second armature being disposed in said second motor, wherein each of said motors include:
   an armature housing;
   a fixed stator being disposed within said armature housing;
   an armature shaft being longitudinally and coaxially disposed within said armature housing;
   said armature being attached to said armature shaft and substantially surrounded by said stator, said armature and armature shaft being rotatable in a first direction and reversible for rotating in a second direction; and
   an armature output gear mounted on an end of said armature shaft opposite from said armature, said armature output gear further defined as a pinion gear having a diameter larger than a thickness measured perpendicular to said diameter.

7. The apparatus of claim 6 further comprising:
   a set of planetary gears operably driven by said armature output gear which acts as a sun gear; and
   a ring gear enmeshed with said set of planetary gears.

8. The apparatus of claim 1 further comprising a magnetic field generated between said armature and a stator within said first motor serves to deter movement of said convertible roof after said roof is in said predetermined stopped position.

9. The apparatus of claim 8 wherein back electromotive force generated by undesired rotation of said armature in relation to said stator causes said magnetic field.

10. The apparatus of claim 1 further comprising:
    a vehicle occupant accessible and operable up/down switch;
    a relay controlled by said up/down switch; and
    input and output electrical circuit paths connected to said first motor electrically short circuited to each other by said relay except when said up/down switch is actuated.

11. The apparatus of claim 10 further comprising a bypass switch actuable to electrically disconnect said motor from an electrical circuit thereby allowing free movement of an armature in relation to a stator within said first motor whereby said portion of said convertible roof can be manually moved while said first motor continues to be engaged therewith.

12. The apparatus of claim 1 wherein said convertible roof is defined as a foldable hard-top roof, said hard-top roof being further defined by a rigid front roof section and a rigid rear roof section, an inside surface of said front roof section folding in a clamshell manner against an inside surface of said rear roof section upon movement to a retracted position.

13. The apparatus of claim 1 wherein said portion of said convertible roof is defined as a rearmost roof bow of a soft-top variety of said convertible roof.

14. An apparatus for an automotive vehicle, said apparatus comprising:
    a) a retractable convertible roof;
    b) an electric motor being operable to move a portion of said convertible roof between a first position and a second position, said motor further being operable to discourage drifting of said portion of said convertible roof once said motor has been deenergized and said portion of said convertible roof has been stopped in a predetermined position, an armature of said motor always being drivably coupled to said convertible roof when installed in said vehicle, said electric motor including:
    an armature housing;
    a fixed stator disposed in said armature housing;
    an armature shaft longitudinally and coaxially disposed in said armature housing;
    said armature being attached to said armature shaft and being substantially surrounded by said stator, said armature and armature shaft being rotatable in a first direction and reversible for rotating in a second direction;
    a pinion gear being mounted on an end of said armature shaft opposite from said armature;
    a set of planetary gears being operably driven by said pinion gear;
    a ring gear enmeshing with said set of planetary gears;

c) a magnetic field generated between said armature and said stator discouraging movement of said convertible roof when said roof is in said predetermined stopped position;

d) a vehicle occupant accessible and operable up/down switch;

e) a relay being controlled by said up/down switch;

f) input and output electrical circuits being connected to said motor and being selectively electrically short circuited to each other by said relay when said up/down switch is not operated by said occupant; and g) a bypass switch being actuable to electrically disconnect said motor from said electrical circuits thereby allowing free movement of said armature in relation to said stator such that said portion of said convertible roof can be manually moved while still being mechanically engaged with said motor.

15. The apparatus of claim 14 further comprising:
a sector gear rotatably driven by said motor; and
a rear roof rail is coupled to said sector gear.

16. The apparatus of claim 14 further comprising a second output pinion gear of said motor directly enmeshed with teeth of said sector gear, said motor always coupling with said sector gear once installed in said automotive vehicle, said sector gear always coupling with said rear roof rail once installed in said automotive vehicle, whereby manual movement of said convertible roof coupled to said rear roof rail causes said sector gear and said output pinion gear to freely rotate when said electrical circuit connected to said motor is electrically opened.

17. The apparatus of claim 15 wherein said convertible roof is further defined as a soft top roof having a top stack mechanism constructed from a plurality of roof bows covered by fabric-type material stretched therebetween.

18. The apparatus of claim 17 further comprising:
a second sector gear journalled upon a member extending from and moving concurrent with said first sector gear, said second sector gear coupled to a rearmost of said plurality of roof bows for providing pivotable movement thereto between a first position and a second lowered position; and
a second electric motor having an output pinion gear directly enmeshed with said second sector gear.

19. The apparatus of claim 14 wherein said convertible roof is defined as a foldable hard-top roof, said hard-top roof is further defined by a rigid front roof section and a rigid rear roof section, an inside surface of said front roof section folds in a clamshell manner against an inside surface of said rear roof section upon movement to a retracted position.

20. The apparatus of claim 14 wherein said portion of said convertible roof is defined as a rearmost roof bow of a soft-top variety of said convertible roof.

21. The apparatus of claim 14 wherein said portion of said convertible roof is defined as a forwardmost portion thereof, whereby said convertible roof latches to a front header without requiring supplemental pulling by a vehicle occupant of said convertible roof toward said front header.

22. An apparatus for an automotive vehicle, said apparatus comprising:
(a) a first electric motor being of a fractional horsepower and direct current variety, said first motor including:
an armature housing;
a permanent magnet fixed stator disposed in said armature housing;
an armature shaft being longitudinally and coaxially disposed in said armature housing;
an armature being affixed to said armature shaft and being substantially circumferentially surrounded by said stator, said armature and said armature shaft being rotatable in a first direction and electrically reversible for rotating in a second direction;
an armature output gear also being mounted on said armature shaft, said armature output gear having a thickness less than a diameter;
a set of planetary gears being operably driven by said armature output gear acting as a sun gear;
a ring gear enmeshing with said set of planetary gears;
an output pinion gear rotating in response to said set of planetary gears;

(b) a sector gear directly enmeshing with said output pinion gear;

(c) a convertible roof being movably coupled to said sector gears;

(d) a rear roof rail of said convertible roof being coupled to said sector gear;

(e) a second electric motor moving in concert with said sector gear; and (f) a rear roof bow of said convertible roof being movably coupled to said second motor.

23. The apparatus of claim 22 further comprising a back electromotive force generated between said armature and said stator in said first motor serving to discourage movement of a portion of said convertible roof after said portion of said roof is in a predetermined stopped position.

24. The apparatus of claim 23 wherein said portion of said convertible roof is defined as a forwardmost portion, whereby said convertible roof is latched to a front header without requiring supplemental pulling by a vehicle occupant of said convertible roof toward said front header.

25. The apparatus of claim 22 further comprising:
rear roof rail of said convertible roof coupled to said sector gears;
a second electric motor moving in concert with said sector gear; and
a rear roof bow of said convertible roof being movably coupled to said second motor.

26. The apparatus of claim 23 further comprising a rearmost roof bow of said convertible roof coupled to said sector gear.

27. The apparatus of claim 22 further comprising:
a vehicle occupant accessible and operable up/down switch;
a relay controlled by said up/down switch; and
input and output electrical circuit paths connected to said first motor electrically short circuited by said relay when said up/down switch is not operated by said occupant.

28. The apparatus of claim 22 further comprising a bypass switch actuable to electrically disconnect said first motor from an electrical circuit thereby allowing free movement of said armature in relation to said stator whereby a portion of said convertible roof can be manually moved while said first motor continues to be engaged.

29. The motor of claim 22 wherein said sector gear provides at least 200 foot/pounds of torque.

30. An apparatus for an automotive vehicle comprising:
first and second electric motors each having an armature;
an electrical circuit being connected to said electric motors;
an up/down switch device;
a bypass switch device selectively electrically disconnecting said motors from a portion of said electrical circuit when in a bypass mode whereby said armatures can be back driven without a magnetic force discouraging rotation of said armatures;

a retractable convertible roof;

said first electric motor being operable to move a portion of said convertible roof between a first position and a second position, said motors further being operable to discourage drifting of portions of said convertible roof once said motors have been deenergized and said portions of said convertible roof have been stopped in predetermined positions and when said bypass switch is in a second mode other than said bypass mode such that back electromotive force generated in said motors act to discourage said drifting;

a set of position sensing devices being electrically connected to said electrical circuit, said set of position sensing devices sensing said positions of said roof; and a microprocessor and a relay being electrically connected to said electrical circuit and serving to control said electric motors in response to said set of position sensing, said up/down switch and said bypass switch devices.

31. The apparatus of claim 30 wherein said first motor includes:

an armature housing;

a fixed stator disposed within said armature housing;

an armature shaft longitudinally and coaxially disposed within said armature housing;

an armature attached to said armature shaft and substantially surrounded by said stator, said armature and armature shaft being rotatable in a first direction and reversible for rotating in a second direction; and an armature output gear mounted on an end of said armature shaft opposite from said armature, said armature output gear further defined as a pinion gear.

32. The apparatus of claim 30 further comprising:

a set of planetary gears operably driven by said armature output gear which acts as a sun gear; and a ring gear enmeshed with said set of planetary gears.

33. The apparatus of claim 30 wherein said bypass switch is located behind a passenger compartment of said vehicle and said electrical circuit includes:

said relay big controlled by said up/down switch; and input and output electrical circuit paths being connected to said motor and being electrically short circuited to each other by said relay except when said up/down switch is actuated.

34. A method of controlling a convertible roof, said method comprising the steps of:

(a) supplying electric current to a first electric motor in a first direction thereby energizing said first motor;

(b) rotating an armature of said first electric motor in a first direction as a function of step (a);

(c) moving a portion of said convertible roof in a first direction as a function of step (b);

(d) generating back electromotive force within said first motor during movement of said portion of said convertible roof after deenergizing said first motor; and (e) mechanically moving an entire second electric motor concurrently with step (c) while said second electric motor is selectively deenergized.

35. The method of claim 34 further comprising the sequential steps of:

(a) releasing an occupant operable switch;

(b) short circuiting input and output circuit paths electrically connected to said first motor; and (c) rotating said armature thereby causing generation of said back electromotive force.

36. The method of claim 34 further comprising the steps of:

(a) activating a bypass switch;

(b) opening a circuit path of said first motor;

(c) moving said portion of said convertible roof in response to manually applied force; and (d) freely rotating said armature of said first motor during step (c) without a magnetic field being created within said first motor.

37. The method of claim 34 further comprising the steps of:

(a) reversing polarity of said electric current supplied to said first motor;

(b) rotating said armature in a second direction opposite from said first direction as a function of step (a); (c) moving said portion of said convertible roof in a second direction opposite from said first direction as a function of step (b); and (d) energizing said second motor and moving a rearmost roof section mechanically independent from movement of said first electric motor.

38. A method of controlling a convertible roof, said method comprising the steps of:

(a) supplying electric current to first and second electric motors in a first direction;

(b) rotating armatures of said electric motors in first directions as a function of step (a);

(c) moving a forwardmost portion of said convertible roof toward a fully raised position as a function of step (b);

(d) magnetically discouraging rearward drifting of said forwardmost portion of said convertible roof after reaching said fully raised position; and (e) energizing a third electric motor and moving a rearmost roof section mechanically independent from movement of said first and second electric motors.

39. The method of claim 38 further comprising the step of latching said forwardmost portion of said convertible roof to a front header without requiring supplemental manual pulling of said convertible roof toward said front header.

40. The method of claim 38 further comprising the sequential steps of:

(a) releasing an occupant operable switch;

(b) short circuiting input and output circuit paths electrically connected to at least one of said motors; and (c) rotating said armature of said at least one motor thereby causing generation of a back electromotive force.

41. A method of controlling a convertible roof, said method comprising the steps of:

(a) Short circuiting a circuit path of an electric motor drivingly coupled to said convertible roof;

(b) accessing a trunk of an automotive vehicle and activating a bypass switch disposed in said trunk;

(c) opening said circuit path of said motor;

(d) moving said portion of said convertible roof in response to manually applied force while maintaining full mechanical driving engagement of said electric motor with said convertible roof; and (e) freely rotating an armature of said motor during step (d) without a magnetic field being created within said motor.

42. An apparatus for operating a convertible top for an automotive vehicle comprising:
(a) first and second electric motors being mounted to a body of said automotive vehicle;
(b) first and second extension brackets moving in response to energization of said first and second electric motors;
(c) a third electric motor moving in concert with one of said extension brackets;
(d) first and second roof rails being affixed to said first and second extension brackets, respectively, for selectively raising and lowering said convertible roof in response to energization of said first and second electric motors; and
(e) a rearmost roof bow being selectively movable in relation to said first and second roof rails upon energization of said third electric motor.

43. The apparatus of claim 42 further comprising a sector gear being enmeshed with an output gear of said first electric motor, said first extension bracket being affixed to said sector gear.

44. The apparatus of claim 42 further comprising an electronic control unit being electrically connected to at least a pair of position sensor and a convertible roof up/down switch, said electronic control unit selectively energizing said first, second and third electric motors in response to said sensor and said switch.

* * * * *

UNITED STATES PATENT AND TRADEMARK OFFICE
CERTIFICATE OF CORRECTION

PATENT NO. : 5,772,274
DATED : June 30, 1998
INVENTOR(S) : Stephen P. Tokarz

It is certified that error appears in the above-indentified patent and that said Letters Patent is hereby corrected as shown below:

Column 12, line 35, before "rear" insert -- a --.

Column 12, lines 34-40, delete Claim 25.

Column 13, line 45, "big" should be -- being --.

Column 14, line 20, begin new paragraph with "(c)".

Column 14, line 23, begin new paragraph with "(d)".

Column 16, line 10, "sensor" should be -- sensors --.

Signed and Sealed this

Sixteenth Day of February, 1999

Attest:

*Acting Commissioner of Patents and Trademarks*

*Attesting Officer*